United States Patent [19]

Bert

[11] E Patent Number: Re. 31,681

[45] Reissued Date of Patent: Sep. 25, 1984

[54] NON-EXPANSIBLE LINKAGE BRACELET AND METHOD OF MANUFACTURE THEREOF

[75] Inventor: Stephen F. Bert, West Warwick, R.I.

[73] Assignee: Textron, Inc., Providence, R.I.

[21] Appl. No.: 459,185

[22] Filed: Jan. 19, 1983

Related U.S. Patent Documents

Reissue of:

[64] Patent No.: 4,245,461
Issued: Jan. 20, 1981
Appl. No.: 52,677
Filed: Jun. 27, 1979

[51] Int. Cl.[3] ..... F16G 13/18

[52] U.S. Cl. ..... 59/82; 63/4; 224/179

[58] Field of Search ..... 59/35 R, 80, 82; 63/4; 224/164, 179

[56] References Cited

U.S. PATENT DOCUMENTS

| | | | |
|---|---|---|---|
| 2,952,120 | 9/1960 | Knoop | 59/82 X |
| 3,195,301 | 7/1965 | Bello | 59/82 X |
| 3,609,963 | 10/1971 | Ichinose | 63/4 X |
| 3,924,418 | 12/1975 | Burkle, Jr. | 224/164 X |
| 3,994,126 | 11/1976 | Rieth | 59/35 R X |
| 4,015,423 | 4/1977 | Brunet | 59/82 |

FOREIGN PATENT DOCUMENTS

| | | |
|---|---|---|
| 61072 | of 1975 | Japan . |
| 128582 | of 1976 | Japan . |
| 68652 | of 1979 | Japan . |
| 410495 | 3/1966 | Switzerland . |
| 2018571 | of 1979 | United Kingdom . |

*Primary Examiner*—Howard N. Goldberg
*Assistant Examiner*—Timothy Eley
*Attorney, Agent, or Firm*—Thompson, Birch, Gauthier & Samuels

[57] ABSTRACT

A non-expansible linkage bracelet and method of manufacture thereof, wherein the bracelet includes: a set of laterally adjacent top links having channel-shaped sections with *width dimensions defined by* parallel side members *which are* joined by top members, [one side member] *the channel-shaped sections* of each top link *being separated by an intermediate decorative section, and each top link* having at least one bendable locking lug protruding [therefrom] *exclusively from one side thereof, each of said decorative sections having at least one recess on the said one side located laterally within said width dimensions, and at least one projection on the side opposite to said one side extending laterally beyond said width dimension* and a set of laterally adjacent bottom links having channel-shaped sections inverted relative to the channel-shaped sections of the top links, the channel-shaped sections of the bottom links having parallel side members joined by bottom members with apertures therein. The side members of adjacent links of one set are arranged in a confronting relationship between the side members of individual links of the other set, with the locking lugs of the top links being received in the apertures in the bottom members of the bottom links. The locking lugs of each top link are bent to overlap the bottom link side members located between the side members of the top links, thereby establishing an interlocked relationship between the links of both sets, *with said projections being received in said recesses.*

16 Claims, 22 Drawing Figures

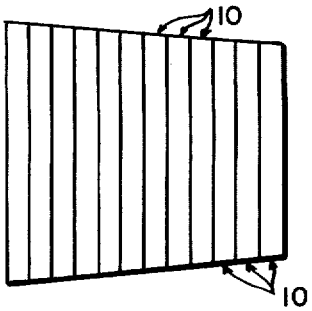
FIG. 1
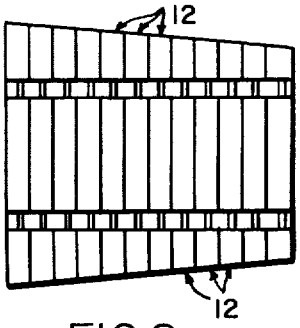
FIG. 2
FIG. 3A
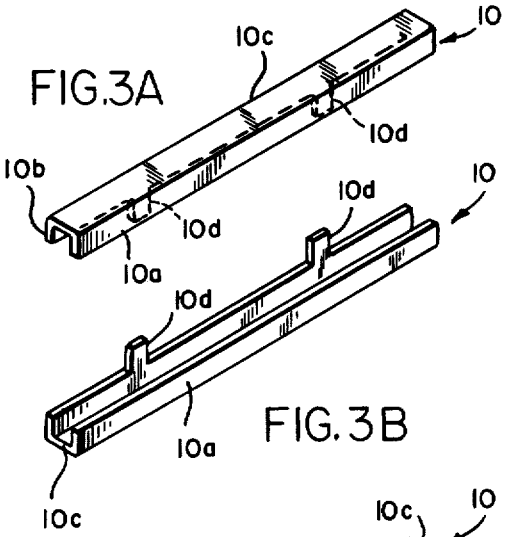
FIG. 3B
FIG. 4A
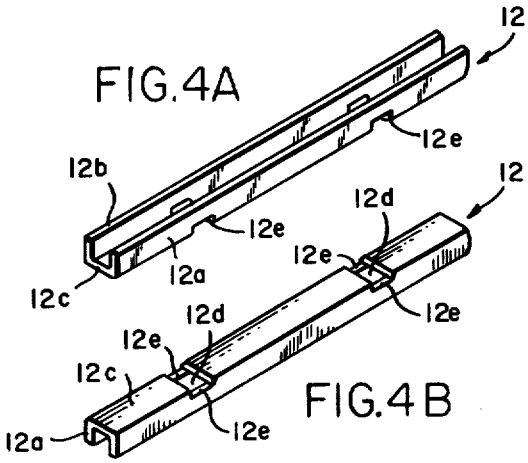
FIG. 4B
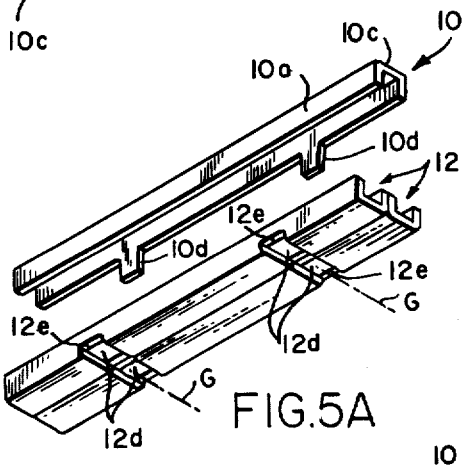
FIG. 5A
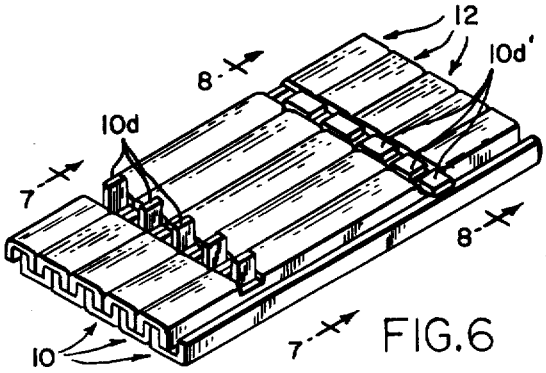
FIG. 6
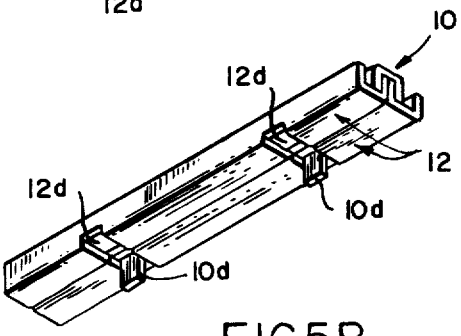
FIG. 5B
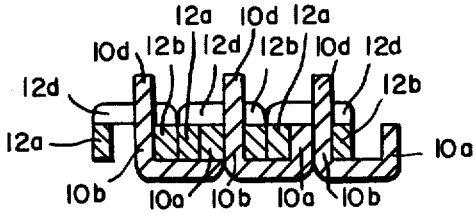
FIG. 7
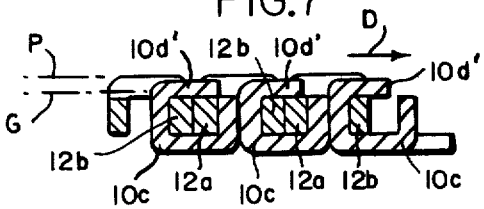
FIG. 8

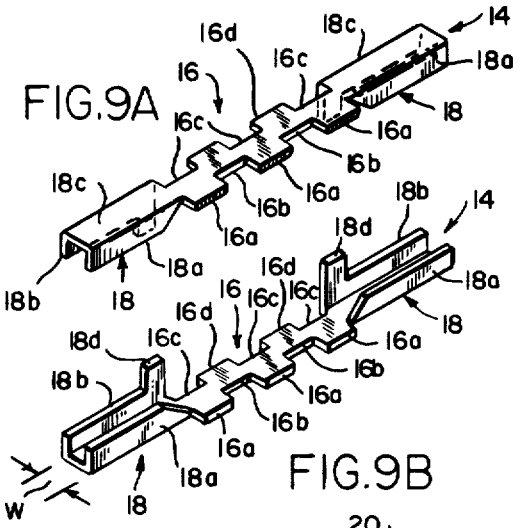
FIG.9A
FIG.9B
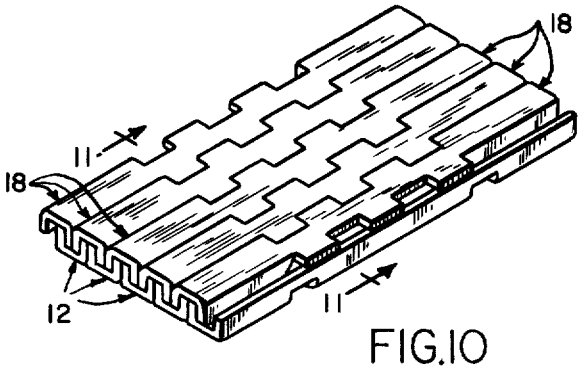
FIG.10
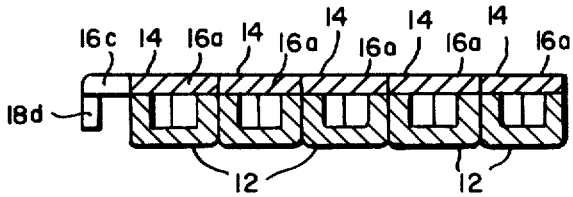
FIG.11
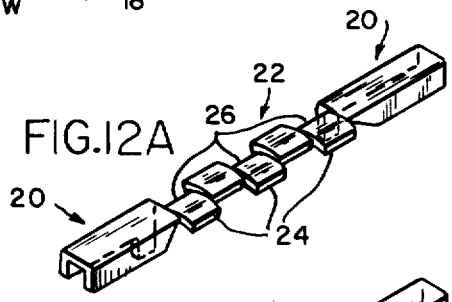
FIG.12A
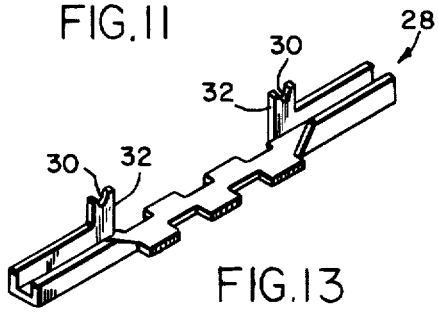
FIG.13
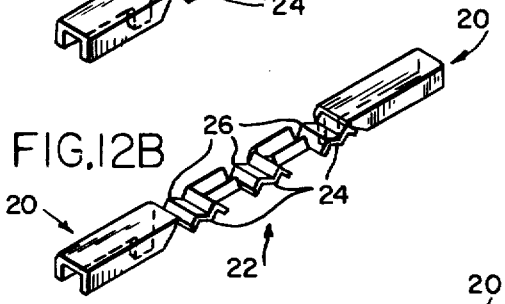
FIG.12B
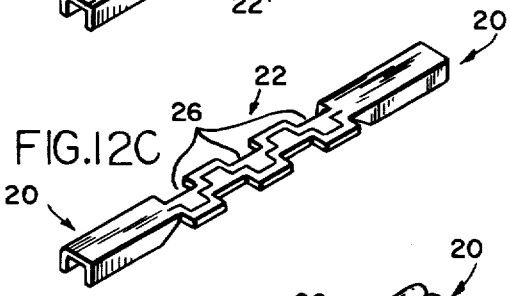
FIG.12C
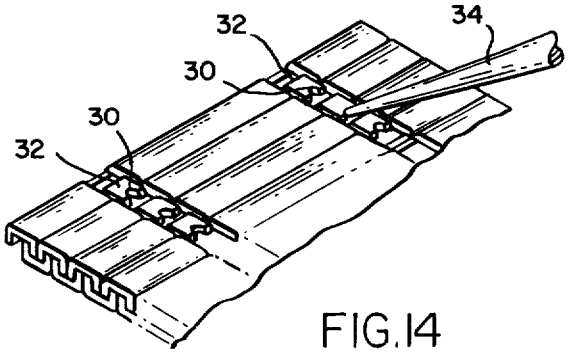
FIG.14
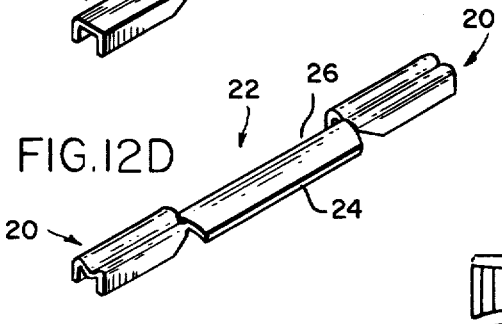
FIG.12D
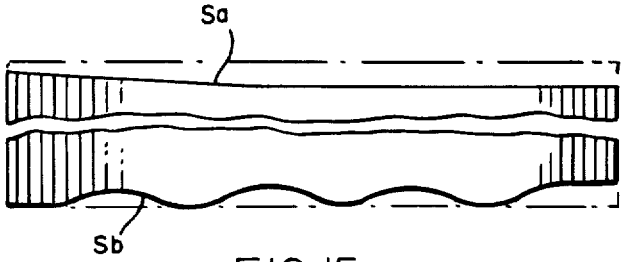
FIG.15

NON-EXPANSIBLE LINKAGE BRACELET AND METHOD OF MANUFACTURE THEREOF

Matter enclosed in heavy brackets [ ] appears in the original patent but forms no part of this reissue specification; matter printed in italics indicates the additions made by reissue.

BACKGROUND OF THE INVENTION

This invention relates generally to bracelets, and is concerned in particular with non-expansible linkage bracelets of the type used with wristwatches and the like.

There has been a long felt need for a non-expansible linkage bracelet comprised exclusively of top and bottom links which are separately fabricated from either the same or different materials, and which are interconnected by an arrangement of bendable locking lugs and cooperative receiving apertures hidden beneath the decorative top bracelet surface and located inwardly from the bracelet side edges. Preferably, the locking lugs are all bent in one direction parallel to the bracelet length.

A bracelet of this type offers a number of important advantages. For example, where the decorative top surface is to be fabricated from a relatively expensive alloy of a precious metal, and is frequently the case, the manufacturer can realize important cost savings by fabricating the bottom links from another less expensive metal. Preferably, this other metal will be of a type which is more resistant to corrosion and deterioration caused by exposure to perspiration from the wearer's skin. An example of another such metal is stainless steel, which in many cases is also used for the top links. By isolating the locking lugs and their cooperative receiving apertures from the top surface of the bracelet, the manufacturer's choice of decorative designs is neither restricted nor adversely affected thus making it possible to provide a much more attractive bracelet. Because the locking lugs and their receiving apertures are located inwardly from the bracelet edges, these edges can be shaped by grinding to further enhance the overall decorative appearance of the finished product. The use of locking lugs on the top links and receiving apertures on the bottom links to interconnect both sets of links simplifies assembly procedures, and where as in the preferred embodiment the lugs are all bent in one direction, automated assembly is greatly facilitated.

The known prior art non-expansible linkage bracelets have failed to satisfactorily meet this long felt need. For example in U.S. Pat. Nos. 1,712,582 (Renz); 1,684,977 (Tost); 2,263,383 (Kestenman); as well as in German Pat. No. 726,942 and British Pat. No. 825,617, the top and bottom links are interconnected by means including bendable lugs or tabs protruding inwardly from the bracelet side edges, thus making it impossible to subsequently shape the bracelet edges by a grinding operation.

The non-expansible bracelet linkages of U.S. Pat. Nos. 1,901,345 (Carlson) and 1,854,857 (Prestinari) each have at least three components, all of which are visible at the top surface of the bracelet. British Pat. No. 969,454 also discloses a non-expansible bracelet linkage having three components.

In U.S. Pat. No. 1,720,235 (Prestinari) and British Pat. No. 969,454, as well as in all of the other patents mentioned above, pairs of locking lugs or tabs are bent in opposite directions towards each other, thus complicating automated assembly and in many cases also providing a restriction against subsequent grinding of the bracelet edges.

BRIEF SUMMARY OF THE INVENTION

The present invention meets the above-described long felt need by providing a non-expansible linkage bracelet consisting of interconnected sets of top and bottom links which may be separately fabricated from either the same or different materials. The top links have channel-shaped sections with parallel side members joined by top members, one side member of each top link having at least one bendable locking lug protruding therefrom. The bottom links also have channel-shaped sections which are inverted relative to the channel-shaped sections of the top links, and which have parallel side members joined by bottom members, the latter having apertures therein. The side members of adjacent links of one set are arranged in a confronting relationship between the side members of individual links of the other set, with the locking lugs of the top links being received in the apertures in the bottom members of the bottom links. The locking lugs of each top link are bent to overlap the bottom link side members located between the side members of the top links, thereby establishing an interlocked relationship between the links of both sets.

The locking lugs of the top links and the apertures in the bottom members of the bottom links are spaced inwardly from the bracelet side edges, thereby allowing the side edges of the bracelet to be shaped as by grinding without affecting the overall strength of the interlocked bracelet. The locking lugs are preferably all bent in one direction parallel to the bracelet length.

BRIEF DESCRIPTION OF THE DRAWINGS

FIG. 1 is a top plan view of one embodiment of a linkage bracelet section embodying the concepts of the present invention;

FIG. 2 is a bottom plan view of the linkage bracelet section shown in FIG. 1;

FIGS. 3A and 3B are perspective top and bottom views respectively of a top link used in the embodiment shown in FIGS. 1 and 2;

FIGS. 4A and 4B are perspective top and bottom views respectively of a bottom link used in the embodiment shown in FIGS. 1 and 2;

FIG. 5A is an exploded perspective view showing a top link spaced vertically above two laterally adjacent bottom links;

FIG. 5B is a perspective view showing an intermediate stage in the assembly of the links of FIG. 5A;

FIG. 6 is a perspective bottom view of a bracelet section with one series of locking lugs protruding vertically through their respective receiving apertures, and with another series of locking lugs bent in one direction parallel to the bracelet length;

FIGS. 7 and 8 are sectional views on an enlarged scale taken respectively on lines 7—7 and 8—8 of FIG. 6;

FIGS. 9A and 9B are perspective top and bottom views respectively of an alternate top link embodiment;

FIG. 10 is a top perspective view of a bracelet section utilizing the top link embodiment shown in FIGS. 9A and 9B;

FIG. 11 is a sectional view on an enlarged scale taken along lines 11—11 of FIG. 10;

FIGS. 12A-12D are top perspective views showing other typical top link embodiments;

FIG. 13 is a bottom perspective view of another top link embodiment having its locking lugs modified to facilitate disassembly;

FIG. 14 is a bottom perspective view of a bracelet section employing top links of the type shown in FIG. 13, and showing a typical tool used to disassemble links by prying up the locking lugs; and FIG. 15 is a plan view of a bracelet section in accordance with the present invention illustrating the subsequent shaping of the bracelet edges as by grinding.

DESCRIPTION OF PREFERRED EMBODIMENTS

FIG. 1 is a top plan view of one embodiment of a bracelet section of the present invention employing straight top or first links 10. FIG. 2 is a bottom plan view of the same bracelet section showing the bottom or second links 12.

With reference to FIGS. 3A and 3B, it will be seen that the straight top links 10 have channel-shaped sections with parallel side members 10a, 10b joined by top members 10c. One of the side members 10b is provided with at least one and preferably several bendable locking lugs 10d protruding therefrom. Although the external surfaces of the top members 10c are shown as being smooth, it will be understood that they may alternatively be milled, stamped or embossed with various decorative designs. As is best shown in FIG. 1, the laterally adjacent external surfaces of the top members 10c cooperate exclusively to define the top surface of the bracelet.

With reference to FIGS. 4A and 4B, it will be seen that the bottom links 12 have channel-shaped sections with parallel side members 12a, 12b joined by bottom members 12c with apertures 12d therein. Preferably, the side members 12a, 12b are notched as at 12e on opposite sides of the apertures 12d.

FIG. 5A shows a single top link 10 spaced vertically above a pair of laterally adjacent bottom links 12, with the locking lugs 10d aligned vertically with the apertures 12d in one of the bottom links. FIG. 5B shows the same three links at an intermediate stage in their assembly after the top link 10 has been lowered into position on the bottom links 12. At this stage, the locking lugs 10d now extend, through their respective apertures 12d.

FIG. 6 is a bottom perspective view of a plurality of top and bottom links 10, 12, with one series of locking lugs 10d in the intermediate stage of assembly as shown in FIG. 5B, and with the other series of locking lugs 10d' bent into their final locked positions.

During assembly, the top and bottom links 10, 12 are first arranged as shown in FIG. 7. The side members 10a, 10b of adjacent top links 10 are arranged in a confronting relationship between the side members 12a, 12b of individual bottom links 12. Likewise, the side members 12a, 12b of adjacent bottom links are arranged in a confronting relationship between the side members 10a, 10b of individual top links. The locking lugs 10d protrude vertically through the apertures 12d, the latter cooperating with their adjacent side wall notches 12e to provide parallel grooves "G" (see FIG. 5A) extending longitudinally along the bottom bracelet surface.

In the final assembly stage shown in FIG. 8, the locking lugs are bent in one direction "D" parallel to the length of the bracelet. The bent locking lugs 10d' thus overlap the bottom link side members 12a, 12b located between the top link side members 10a, 10b, thereby establishing an interlocking relationship between the top and bottom links 10, 12. When thus interlocked, the side members 12a, 12b of the bottom links 12 are held between the top members 10c and the bent locking lugs 10d' of the top links 10. The locking lugs 10d' are bent into the grooves G and preferably are recessed beneath the plane "P" of the bottom bracelet surface.

The locking lugs 10d and their respective receiving apertures 12d are spaced inwardly from the side edges of the bracelet. As shown schematically in FIG. 15, this permits the side edges of the bracelet to be decoratively shaped, as by grinding from their original straight parallel configurations shown by the dot-dash lines, to a variety of modified designs, such as the tapered or curved configurations shown by the solid lines at $s_a$ and $s_b$.

Referring now to FIGS. 9A and 9B, an alternate embodiment of a top link is shown at 14. Link 14 has a generally planar decorative section 16 located intermediate channel-shaped sections 18 at the opposite ends thereof. As with the straight top link embodiment, each channel-shaped section 18 has parallel side members 18a, 18b interconnected by top members 18c, one side member 18b of each end section 18 having a bendable locking lug 18d protruding therefrom. From FIG. 10, it will be seen that the channel-shaped sections 18 and their respective locking lugs 18d cooperate in an inverted interlocked relationship with bottom members 12 of the type shown in FIGS. 4A and 4B.

The decorative sections have projections 16a on one side which extend laterally beyond the width dimension "W" of the channel-shaped sections 18. The projections 16a are spaced by recesses of notches 16b which have their bases aligned with the sides 18a. The opposite sides of the decorative sections 16 have notches 16c which extend inwardly of the sides 18b, forming projections 16d with outer ends even with the sides 18b. When assembled as shown in FIG. 10, the projections 16a, 16d of each top link 14 are received respectively in the recesses 16c, 16b of laterally adjacent top links to provide a highly decorative interlocking design.

FIGS. 12A-12D show typical examples of other alternative top link designs which may be employed with the bottom links 12. Each of these top links have channel-shaped end sections 20 with intermediate decorative sections 22. Each decorative section 22 has one or more projections 24 on one side received in recesses 26 on the other side. It will thus be seen that the design variations are considerable, making this bracelet design highly adaptable to different decorative motifs.

FIG. 13 shows a top link 28 with tool receiving notches 30 formed at the ends of its bendable locking lugs 32. When the lugs 32 are bent into their interlocked operative positions as shown in FIG. 14, the notches 30 are arranged to receive a suitably shaped tool such as a pointed jeweler's pick 34. The pick 34 can be used to pry up the lugs 32 when adding or subtracting links in order to adjust the overall bracelet length.

The method of manufacturing linkage bracelets in accordance with the present invention will now be described using the linkage bracelet of FIGS. 1-8 as an example. The top and bottom links 10, 12 are first fabricated, typically as metal stampings, from either the same or different materials. The top and bottom links are then arranged in an intermediate stage of assembly as shown in FIG. 7. Then, the locking lugs 10d are bent to the position as shown at 10d' in FIGS. 6 and 8 to interlock the top and bottom links. Thereafter, the sides of the bracelet may be ground to any desired shape, for example as shown in FIG. 15.

I claim:

1. A non-expansible linkage bracelet comprising: a set of laterally adjacent top links having channel-shaped sections with *width dimensions defined by* parallel side members *which are* joined by top members, [one side member] *the channel-shaped sections* of each top link *being separated by an intermediate decorative section, and each top link* having at least one bendable locking lug protruding [therefrom] *from one side thereof, each of said decorative sections having at least one recess on the said one side located laterally within said width dimension, and at least one projection on the side opposite to said one side extending laterally beyond said width dimension*, a set of laterally adjacent bottom links having channel-shaped sections inverted relative to the channel-shaped sections of said top links, the channel-shaped sections of said bottom links having parallel side members joined by bottom members with apertures therein; the side members of adjacent links of one set being arranged in a confronting relationship between the side members of individual links of the other set, with the locking lugs of said top links being received in the apertures in the bottom members of said bottom links, the locking lugs of said top links being bent to overlap the bottom link side members located between the side members of said top links, thereby establishing an interlocked relationship between the links of both sets, *with said projections being received in said recesses*.

2. This linkage bracelet of claim 1 wherein all of said locking lugs are bent in one direction parallel to the length of said bracelet.

3. The linkage bracelet of claim 2 wherein the side members of said bottom links are provided with notches opening into the apertures in said bottom members, the notches and apertures of adjacent bottom members being aligned to provide grooves extending longitudinally along the bottom surfaces of said bracelet, with said locking lugs being bent into said grooves to establish the aforesaid interlocked relationship between the links of both sets.

4. The linkage bracelet of claims 1 or 3 having a bottom surface defined by the exterior surfaces of said bottom members and wherein the bent locking lugs are recessed beneath the plane of said bottom surface.

5. The linkage bracelet of claim 1 wherein said top and bottom links are fabricated of different materials.

6. The linkage bracelet of claims 1 or 5 having a top decorative surface provided exclusively by said top links.

7. The linkage bracelet of claim 1 wherein said locking lugs and said apertures are spaced inwardly from the side edges of said bracelet.

8. The linkage bracelet of claims 1, 2 or 7 wherein said locking lugs are provided at the ends thereof with tool receiving means to facilitate reverse bending thereof when disassembling said linkage bracelet.

9. The linkage bracelet of claims 1, 2 or 7 wherein the side members of said bottom links are held between the top members and the bent locking lugs of said top links.

[10. The linkage bracelet of claim 1 wherein said top links have planar decorative sections located intermediate channel-shaped sections at the opposite ends thereof.]

[11. The linkage bracelet of claim 10 wherein said decorative sections have projections extending laterally beyond the width dimension of the channel-shaped sections of said top links, and recesses located laterally within said width dimension, with the projections of one top link being received in the recesses of the next laterally adjacent top link.]

12. The linkage bracelet of claim [11] *1* wherein the projections of said top links overlap the side members of said bottom links.

13. A non-expansible linkage bracelet comprising: a set of laterally adjacent first links having channel-shaped sections with *width dimensions defined by* first side members *which are* joined by first intermediate members, [one first side member] *the channel-shaped sections* of each first link *being separated by an intermediate decorative section, and each first link* having at least one bendable locking lug protruding [therefrom] *from one side thereof, each of said decorative sections having at least one recess on the said one side located laterally within said width dimension, and at least one projection on the side opposite to said one side extending laterally beyond said width dimension*; a set of laterally adjacent second links having channel-shaped sections inverted relative to the channel-shaped sections of said first links, the channel-shaped sections of said second links having second side members joined by second intermediate members with apertures therein; the side members of adjacent links of one set being arranged in a confronting relationship between the side members of individual links of the other set, with the locking lugs of said first links being received in the apertures in said second intermediate members, said locking lugs being bent to overlap the second side members located between the first side members of said first links, and the second side members of said second links being confined between the first intermediate members and the bent locking lugs of said first link members, *with said projection being received within said recesses*.

14. A method of manufacturing a non-expansible linkage bracelet comprising:

fabricating top and bottom sets of links, said top links having channel-shaped sections with *width dimensions defined by* parallel side members *which are* joined by top members, [one side member] *the channel-shaped sections* of each top link *being separated by an intermediate decorative section, and each top link* having at least one bendable locking lug protruding [therefrom] *from one side thereof, each of said decorative sections having at least one recess on the said one side located laterally within said width dimensions, and at least one projection on the side opposite to the said one side extending laterally beyond said width dimension*, and said bottom links having channel-shaped sections with parallel side members joined by bottom members with apertures therein;

assembling said top and bottom sets of links, with the links of each set being laterally adjacent to each other and extending transversally relative to the bracelet length, with the channel-shaped sections of the links of one set being inverted relative to the channel-shaped sections of the links of the other set, with the side members of adjacent links of one set being arranged in confronting relationship between the side members of individual links of the other set, and with the locking lugs of said top links being received in the apertures in the bottom members of said bottom links; and, bending the locking lugs of each top link to overlap the bottom link side members located between the side members of said top links, thereby establishing an interlocked relationship between the links of both sets, *with said projections being received in said recess.*

15. The method of claim 14 wherein said locking lugs are all bent in one direction parallel to the length of said bracelet.

16. The method of claims 14 or 15 including the step of grinding the side edges of said bracelet to impart a desired configuration thereto.

* * * * *